US005900139A

United States Patent [19]

Bielfeldt

[11] Patent Number: 5,900,139

[45] Date of Patent: May 4, 1999

[54] FILTER PRESS FOR REDUCING THE WATER CONTENT OF SOLID MATERIALS AND/OR SLUDGES

[75] Inventor: Friedrich B. Bielfeldt, Prahl, Germany

[73] Assignee: Maschinenfabrik J. Dieffenbacher GmbH & Co., Eppingen, Germany

[21] Appl. No.: 08/822,327

[22] Filed: Mar. 21, 1997

[51] Int. Cl.[6] .............................. B01D 17/12; B30B 9/06; B65B 15/26; B65B 15/34

[52] U.S. Cl. ................................ 210/85; 100/45; 100/48; 100/74; 100/118; 100/152; 210/141; 210/175; 210/400

[58] Field of Search .................................... 210/110, 134, 210/141, 143, 224, 259, 348, 387, 400, 401, 720, 85, 86, 175, 184, 774; 100/45, 48–50, 118, 152, 154, 225, 232, 73, 74, 75, 157, 311

[56] References Cited

U.S. PATENT DOCUMENTS

| | | | |
|---|---|---|---|
| 3,720,159 | 3/1973 | Gunkel | 100/118 |
| 4,033,253 | 7/1977 | Stullenwerk et al. | 100/118 |
| 4,702,745 | 10/1987 | Kamei et al. . | |
| 4,906,369 | 3/1990 | Bahr | 210/401 |
| 5,051,194 | 9/1991 | Bahr | 210/401 |
| 5,573,667 | 11/1996 | Benesi | 210/400 |
| 5,645,614 | 7/1997 | Dummersdorf et al. | 210/770 |

FOREIGN PATENT DOCUMENTS

| | | |
|---|---|---|
| 2305436 | 4/1997 | United Kingdom . |

*Primary Examiner*—Joseph W. Drodge
*Attorney, Agent, or Firm*—Foley & Lardner

[57] ABSTRACT

A filter press for reducing the water content in a starting material including a pressure chamber with a stationary lower plate and five hydraulically mobile chamber walls for applying pressure to the starting material.

11 Claims, 4 Drawing Sheets

FILTER PRESS FOR REDUCING THE WATER CONTENT OF SOLID MATERIALS AND/OR SLUDGES

BACKGROUND OF THE INVENTION

The invention relates to a plant, a press and a control device for reducing the capillary-bound water content in fiber cells of carbon-containing, finely comminuted solid materials and/or sludge.

The object underlying the invention of German patent 1 95 35 315.3 is to make it possible, by means of a new method, to use raw brown coal on a large-scale industrial basis by means of a thermomechanical dewatering, in which the overall efficiency of the conversion in power plant processes is improved and in which the continuous throughput of large amounts of coal-containing solids required for this purpose is achieved. In order to avoid blow-off at the edges of the bulk material mat under the action of the steam pressure and to achieve a uniform distribution of thermal energy over the press surfaces without reducing the steam pressure at the edges, it was further intended to provide a technical solution for a plant and press which no longer contains, or which avoids, the disadvantages described.

In terms of the method, this object is achieved by the combination of the following process steps:

a) a starting material is used which at the beginning of the cycle, is vapor-blasted in a pressure chamber, which is sealed in an essentially steam-tight manner and has been preheated to above 100° Celsius, and using a steam which has been superheated to ≧150° Celsius, b) the compacting pressure on the starting material is greater than the pressure prevailing in the starting material as a result of the bulk density, corresponding at most to approximately the steam pressure introduced of 5 bar to 8 bar, and, then c) after having reached a temperature of about ≧125° Celsius in the starting material, the injection of steam is terminated and, depending on the particle size of the starting material, a high mechanical, specific press pressure of up to at most 75 bar becomes effective, in order to effect reduction to a residual water content of up to 20 percent by weight.

The thermomechanical dewatering method as disclosed in German patent 1 95 35 315.3 makes it possible to dewater brown coal economically with a low consumption of thermal and mechanical energy. The overall efficiency of the power plant process for the conversion of brown coal with a high moisture content can be significantly improved by the upstream connection of the method in accordance with the invention for removing the water, which method is beneficial in terms of energy. Moreover, compared with the known thermal drying methods, the energy required to evaporate the water is cut down.

The solution in terms of the plant for carrying out the process steps disclosed in German patent 1 95 35 315.3 consists in guiding a revolving scattering belt through a pressure chamber which is integrated in a single-daylight press and in opening and closing this pressure chamber by means of a lock system during the operations of the process sequence, the main components of the plant comprising a reversible, continuously operating scattering machine, a heatable, discontinuously operating filter press and a scattering belt box system with a rectangular scattering profile for the brown coal granules, the endless scattering belt of which system is guided in a revolving manner by two endless side steel belts through a pressure chamber, which can be sealed in a gastight manner, in the press, and it being possible to close and open the pressure chamber, transversely to the direction of transportation in the entrance and exit thereof, by means of a board which can be raised and lowered and a blocking slide gate.

Since it is necessary, for large power-plant outputs, for example for one Gigawatt power-plant output, to use a plurality of press lines each having a raw brown coal throughput in the feed region of about 200 tonnes per hour and the drying operation in each case takes place within a cycle of about 10 minutes, this amount has to be introduced into the pressure chamber via the scattering machines intermittently six times per hour, that is to say 33 tonnes per feed operation. That means, for a bulk density of about 600 $kg/m^3$, about 55 $m^3$ of granulated raw brown coal have to be transported into the pressure chamber uniformly with a rectangular scattering profile at a transport speed of about 0.5 m per second within a time of about 70 seconds. The problem therefore resides in controlling the volumetric flow of about 0.8 to 1 $m^3$ per second in a uniform scattering height in discontinuous operation. This problem cannot be easily mastered using a continuous scattering and a reversible scattering machine above a fixed scattering and feed belt. The length which is required for the scattering and feed belt and the space required for this also have a disadvantageous effect on the costs of the plant.

SUMMARY OF THE INVENTION

The invention is based on the object of providing a plant by means of which, in the course of a "stop and go" operation of the discontinuously operating filter press, a rectangular scattering profile at a scattering height of 400 to 500 mm can be achieved without problems from the start to the end of the feed operation—with a planar accumulation of the raw brown coal granules—and thus a quasi-continuous operation is made possible intermittently in a direction of transportation with low space requirements and reduced assembly costs.

This object is achieved by a filter press for dewatering a starting material by applying thermal energy in the form of super heated steam and mechanical energy in the form of surface pressure. The filter press comprises a pressure chamber releasably sealable in a gastight manner with an entrance and an exit. The pressure chamber includes a substantially stationary, heated lower press plate and a plurality of hydraulically mobile chamber walls including first and second blocking slide gates for releaseably blocking the entrance and exit of the pressure chamber; two bulkheads disposed vertically at outer longitudinal edges of the lower press plate, the bulkheads being pressed with variable hydraulic forces against longitudinal edges of the upper press plate; an upper press plate, disposed between the exit and entrance and disposed between the two bulkheads, for applying pressure to the starting material; hydraulic actuators for moving first and second blocking gates to block and open the entrance and exit; and pressing cylinders for controlling the movement of the upper press plate.

An advantage of the solution according to the invention which can be cited is that, in accordance with the objective, the metering for each scattering and feed operation can be carried out precisely within the rectangular scattering profile uniformly in accordance with the discharge rate of the scattering and feed belt.

Furthermore, the following features of the plant and filter press can be cited as advantages, and simultaneously as cost-reducing measures:

the scattering machine forms a structural unit with the hopper and is arranged fixed upstream of the filter press, loosening and metering rollers are provided upstream of the outlet opening for the raw brown coal granules in the scattering machine, the scattering machine has an outlet slot which can be adapted to the particular throughput of the raw brown coal granules and can be adjusted for this, furthermore, a vibrating conveyor which can be adapted to the discharge rate of the scattering and feed belt is arranged beneath the outlet slot of the scattering machine and, in order to form the rectangular scattering profile on the scattering and feed belt, stationary bulkheads are arranged below the scattering machine and flexible bulkheads are arranged as far as the filter press and also displaceable bulkheads are arranged within the filter press.

A further advantage here is that the transfer belt can be arranged directly above the hopper and thus the complete plant is considerably shorter with a lower spatial requirement for the installation.

BRIEF DESCRIPTION OF THE DRAWINGS

Further advantages of the invention can be taken from the following description of the drawing and the additional and subordinate claims. In the drawings:

DETAILED DESCRIPTION OF PREFERRED EMBODIMENTS

Figure 1:
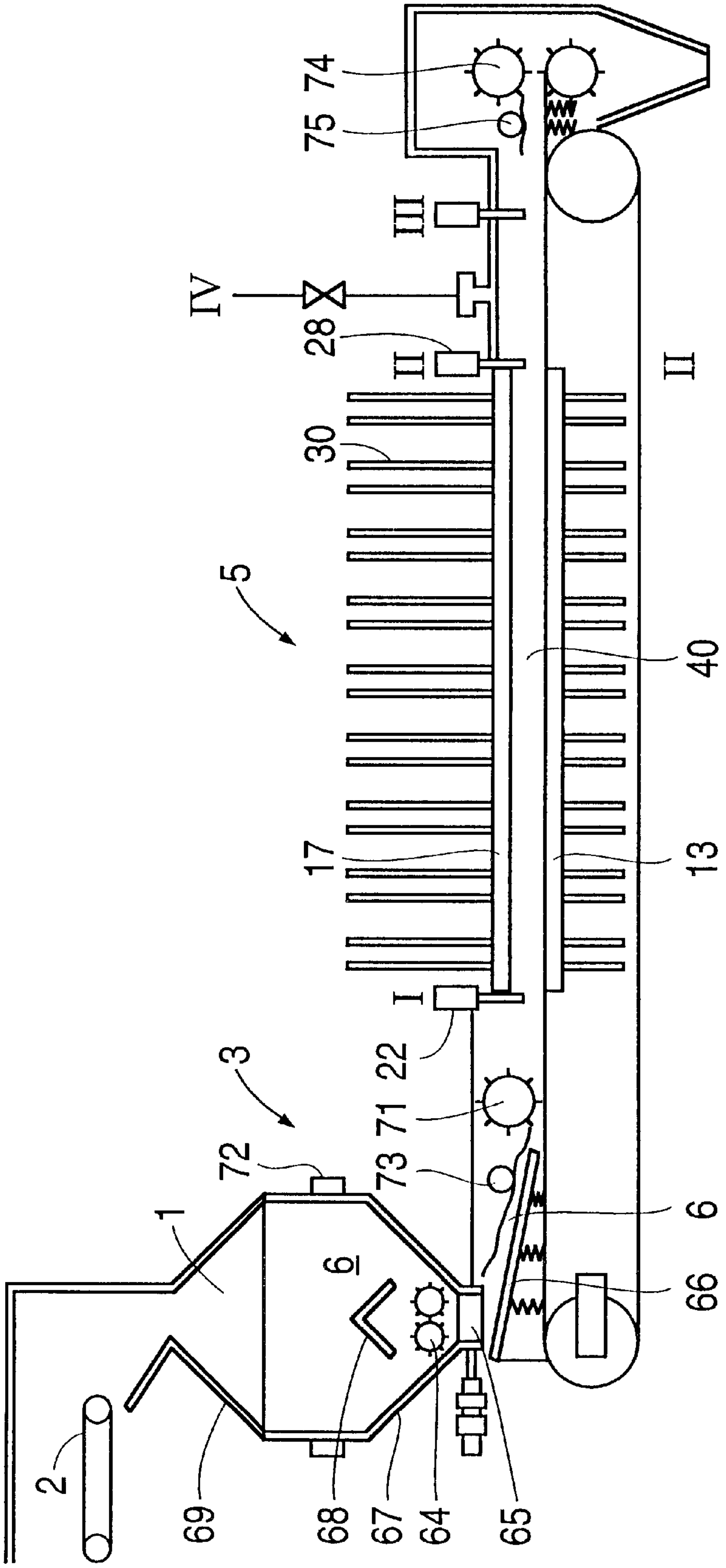
FIG. 1 shows a diagrammatic representation of the plant according to the invention with the feeding for the filter press according to the invention with raw brown coal granules during the scattering and feed operation, in elevation.

The drawing according to FIG. 1 shows the subject matter of the invention, comprising the region of the plant for the process for the thermomechanical dewatering for the raw brown coal granules 6, comprising:

A) a scattering section for a discontinuous scattering of the starting material in bed form on to the scattering and feed belt 4, B) a single-daylight filter press 5 with integrated pressure chamber and lock system, and C) the transportation of the pressed slab 31 of brown coal out of the pressure chamber 40 with prebreaking device 74 for a subsequent grinding drying.

The scattering section A of FIG. 1 furthermore illustrates the continuous transfer of the raw brown coal granules 6 from the transfer belt 2 into the fixed hopper 1. The stationary scattering machine 3, which forms a structural unit with the hopper 1, scatters the raw brown coal granules 6 onto the scattering and feed belt 4, which is guided in circulation through the filter press 5. The scattering and feed belt system comprises the lower endless scattering and feed belt 4 and the two bulkheads 63 arranged vertically fixed on the latter to the left and right inside the filter press 5 and the bulkheads 70 and 76 outside. The scattering and feed belt 4 is in this case configured as a steam-permeable metal fabric belt and is guided running synchronously through the pressure chamber 40 of the filter press 5. The raw brown coal granules 6 are scattered up to the bulk material height H in a precisely geometrically rectangular cross-section from the scattering machine 3 and are then introduced unaltered into the pressure chamber 40 and removed following pressing, as shown in FIGS. 1 to 5.

Figure 2:
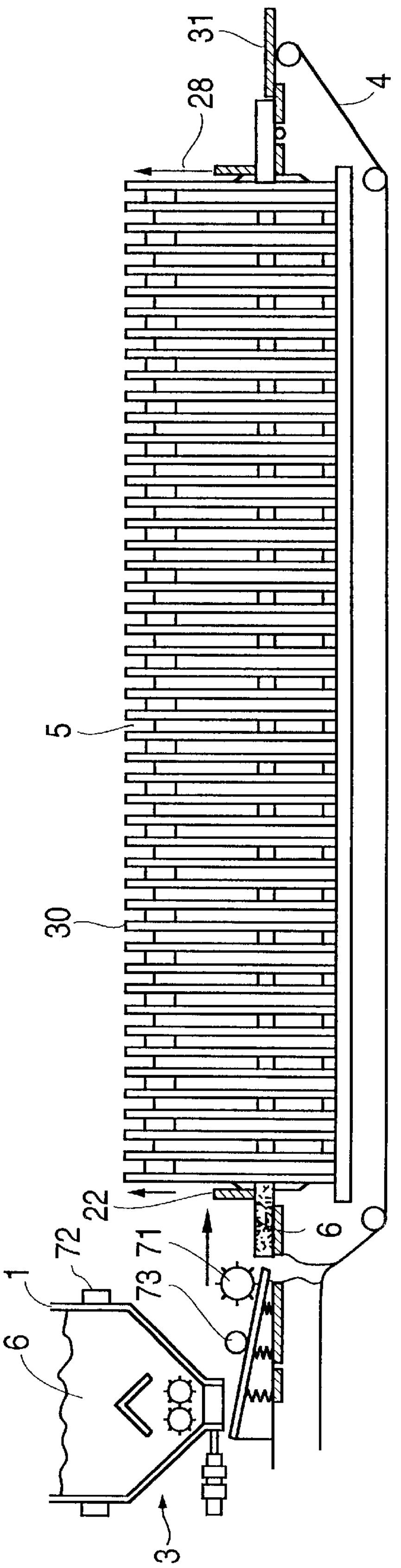
FIG. 2 shows the filter press with scattering machine according to FIG. 1 on a larger scale.
Figure 3:
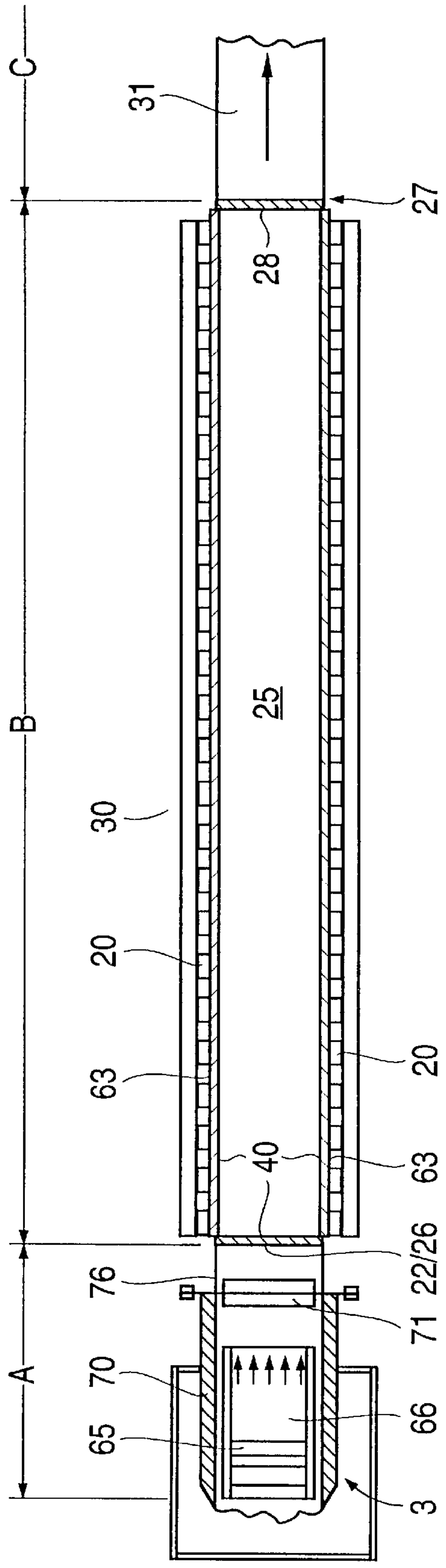
FIG. 3 shows the filter press with scattering machine in plan view.

FIGS. 1, 2 and 3 show the conveying and scattering system according to the invention for the raw brown coal granules 6. By means of the transfer belt 2, the hopper 1 is continuously fed with prebroken raw brown coal, that is to say with raw brown coal granules 6. For this material, the hopper 1 has a storage volume of about 2 filling units for the operating cycle of the filter press 5. The scattering machine 3 is arranged in the lower part of the hopper 1, forming a structural unit with the latter. In order to achieve a controlled metering of the raw brown coal granules 6, it is necessary to prevent a blockage of the conveying stream within the hopper 1. For this purpose, corresponding vibration devices 72 are arranged on the outer shaft walls 69, in order to achieve a continuous volume flow of the raw brown coal granules 6, in particular at the oblique shaft walls 69. Conveying stream guide planks 67 are provided inside the hopper 1 above the loosening and metering rollers 64, so that the operation of the individually adjustable operating members is not impeded by a build-up of bulk material. The conveying stream inside the hopper 1 to the loosening and metering rollers 64 is designed geometrically so as to be free of blockages by means of guide plates 68. The scattering operation is initiated discontinuously and in accordance with the transport speed ($v \geqq 0.5$ m/s) of the scattering and feed belt 4 lasts about 21 sec. In order to achieve an accumulation which is as homogenous as possible and has a uniform bulk material height H of about 430 mm on the scattering and feed belt 4, the following control operations are provided:

the bed of raw brown coal granules is poured over a width of about 2.5 m from the scattering machine between the fixed bulkheads 70 onto the scattering and feed belt 4, that is to say it is also discharged with this width from the hopper 1 by means of a vibrating conveyor 66. The volumetric flow is controlled by means of the bulk height sensor 73 arranged directly upstream of the doctor roller 71. In this process, the feeding and scattering operation is controlled in accordance with a priority sequence to be determined experimentally following the functional chain below:

the circumferential speed of the loosening and metering rollers 64 in the hopper 1 the outlet slot 65 by means of a slide gate beneath the bunker 1, and the discharge rate of the vibrating conveyor 66 as a function of the transportation speed of the scattering and feed belt 4.

An excess or insufficient feed (wave crest or trough), which is indicated by a bulk height measurement by means of, for example, height measuring wheels 73 and 75 and the height X of the dewatered slab 31 of brown coal, can thus be compensated for by controlling the adjustment speeds of the above functional members with respect to one another. In addition, in the event of an excess or insufficient feed, or in the event of exceeding a tolerance window (maximum/minimum size), the transport speed of the scattering and feed belt 4 can be reduced or increased in the course of an adaptive adjustment. By assigning these parameters, a uniform accumulation and feed can be achieved within this control chain during the stop and go operation.

At the same time that the bed of raw brown coal granules is being filled onto the scattering and feed belt 4 and the slab 31 of brown coal is being discharged from the filter press 5, the next bed of raw brown coal granules is introduced. Before starting up the scattering and feed belt 4, the pressure chamber 40 is opened at the entrance 26 and exit 27 and the bulkheads 63 of the pressure chamber 40 are relieved of pressure, that is to say released. The bed of raw brown coal which has been poured on is transported as far as the exit 27 by means of the numerical control system of the scattering and feed belt 4. After the scattering and feed belt 4 has reached the discharge lock II, the pressure chamber 40 is closed again, that is to say the bulkheads 63 are deployed again (pressing stroke of about 5 mm) and the entrance 26 and exit 27 are closed again.

The filter press 5 with integrated pressure chamber and lock system in the pressure chamber pressing region B is configured in accordance with the drawing as a stationary single-daylight downstroke press. The scattering and feed belt 4 is introduced continuously with the raw brown coal granules 6 from the scattering section A into the pressure chamber pressing region B, in that it slides over the lower, fixedly arranged, heated press plate 13 of the pressure chamber 40. Central horizontal bores in the press plate 13 provide the heating, while vertical steam-injection bores are arranged uniformly distributed over the press and filter surface 25. The upper press plate 17 is designed in the same way.

Figure 4:
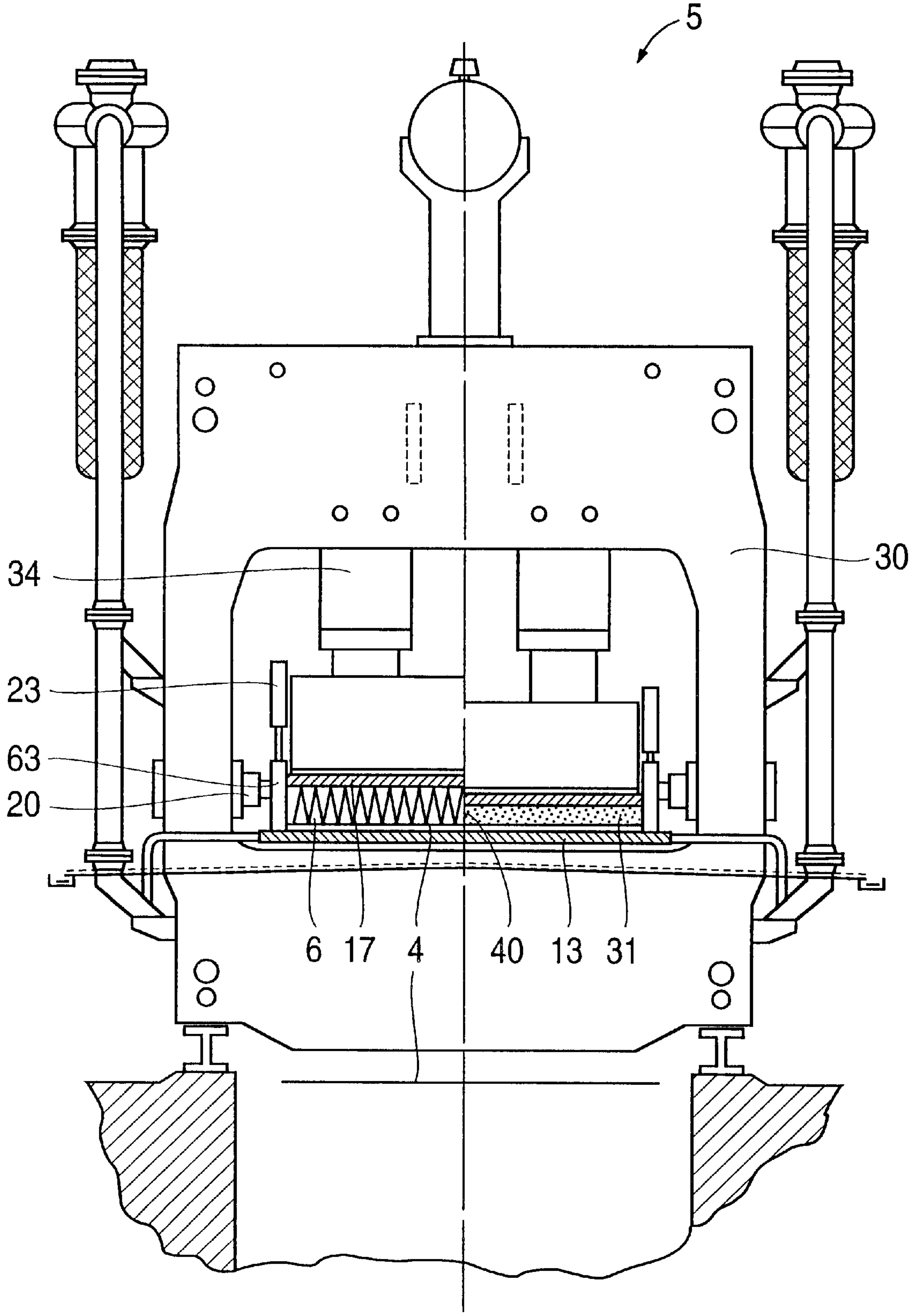
FIG. 4 shows a section of the filter press from the front.
Figure 5:
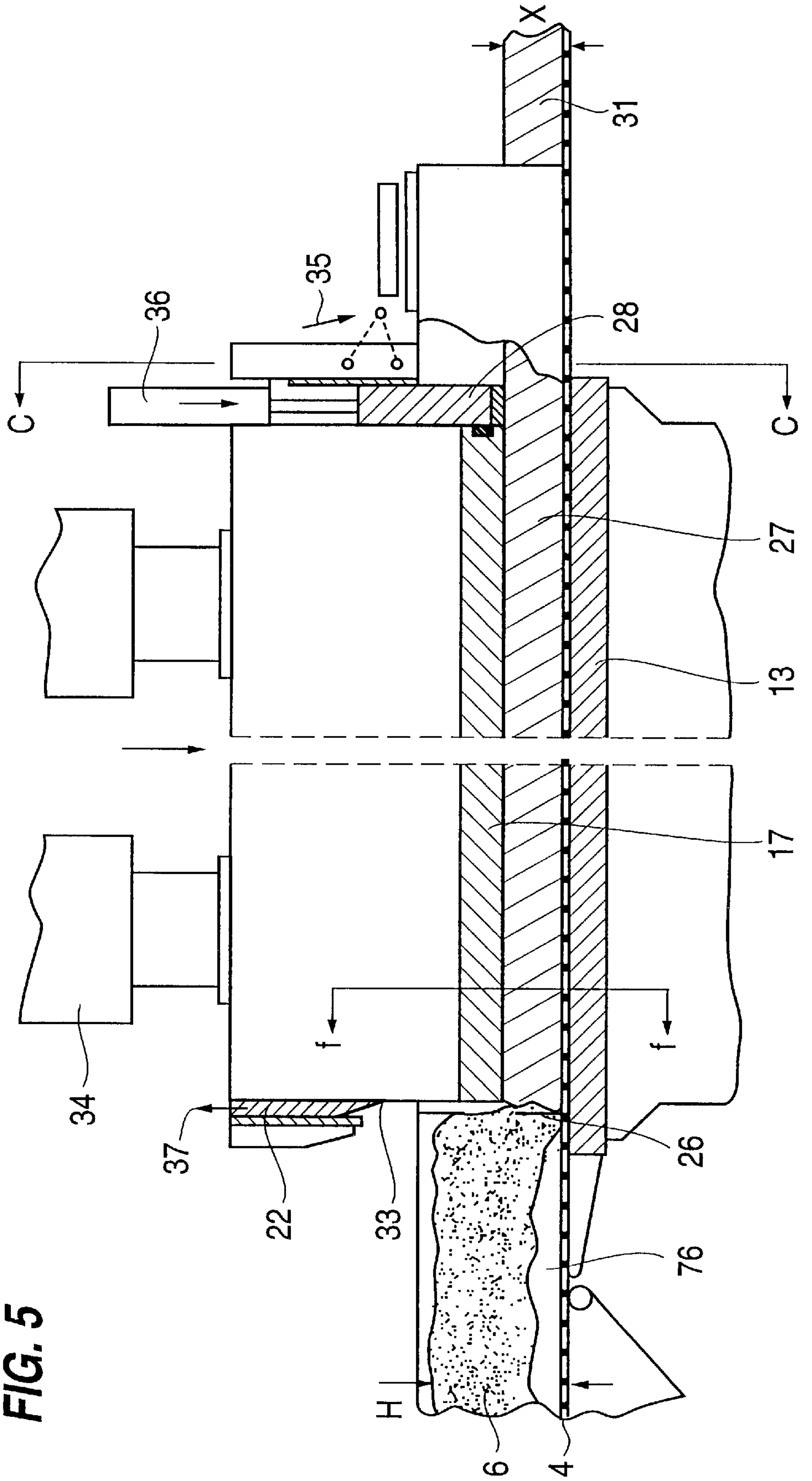
FIG. 5 shows details in excerpts of the pressure chamber system for the entry and exit of the filter press according to FIG. 2.

The pressure chamber system (in region B) is shown in FIGS. 4 and 5. The material flow is surrounded on all sides and enclosed in a steam-tight manner, so that steam can flow uniformly around raw brown coal granules 6 which have been introduced into the filter press 5 by means of the scattering and feed belt 4. The pressure chamber system is in this case formed by the following functional components:

the lower, stationary press plate 13, which is mounted in the press frame 30, the vertical bulkheads 63, which stand at the two longitudinal sides of the press plate 13, are in each case arranged to the left and right and are in turn pressed laterally, by means of hydraulic short-stroke cylinders 20, against the upper press plate 17, which is driven by the hydraulic press cylinders 34, and the long-stroke cylinders 34, which act vertically from above, and the short-stroke cylinders 20, which press horizontally from both sides onto the pressure chamber 40. The cylinders 34 and 20 are in each case assigned to the press frame 30 and arranged at the longitudinal sides and end sides of the pressure chamber 40.

The scattering and feed belt 4, with the bulkheads 63, 70 and 76 designed as a scatter box, is pulled synchronously through the pressure chamber 40 by means of drum drives, the vertical bulkheads 63 inside the filter press 5 being horizontally displaceable, the bulkheads 76 outside the filter press 5 in the region of the scattering section A being arranged flexibly and the bulkheads 70 beneath the scattering machine 3 being arranged fixedly. As a conveying aid for further transportation of the raw brown coal granules 6, the bulkheads 63, 70 and 76 are equipped with vibration devices 72. The bulkheads 63 inside the filter press 5 are controlled in terms of lateral pressure by means of the hydraulic short-stroke cylinders 20, that is to say they are relieved of pressure during the transporting movement of the scattering and feed belt 4 and are pressed with varying lateral compressive forces against the upper press plate 17 during the injection of steam and the pressing operation. The upper press plate 17 is sealed in a gastight manner against the steam pressure by means of an elastic rubber seal. The bulkheads 63 are in turn sealed in a gastight manner by elastomeric seals with respect to the sealed lower edge of the press plate 13 when the bulkheads 63 are pressed down vertically by means of the hydraulic pressing cylinders 23 when the scattering and feed belt 4 is at a standstill. The entry and discharge locks I and II or the entrance and exit 26 and 27 on the pressure chamber system are shown by FIGS. 1, 2, 3 and 5.

FIG. 1 illustrates the lock mechanism in the open state of the filter press 5 for introducing the bed of brown coal granules. In parallel with the introduction of the bed of brown coal granules into the pressure chamber 40, the blocking slide gate 28 in the exit 27 is moved into the closure position, by means of a vertical movement on the part of the hydraulic actuator 36, for the following steam injection process. The blocking slide gate 22 in the entrance 26 is in this case moved far enough upward, that is to say released, that the bed of brown coal granules having the bulk material height H (see FIG. 5) can be introduced into the pressure chamber 40 without interference.

FIG. 4 and FIG. 5 show the pressure chamber 40 in the closed position. The upper press plate 17 has also been moved into position for the isochoric compaction of the raw brown coal granules 6. The blocking slide gate 28 and the blocking slide gate 22 can be set variably in terms of height X in accordance with the height of the pressed slab 31 of brown coal or the bulk material height H. The blocking slide gate 28 is lowered hydraulically, in a planar manner, horizontally and vertically, by means of the pressing devices 35 and hydraulic actuator 36 onto the raw brown coal granules 6 and presses in a sealing manner against the scattering and feed belt 4, so that a seal which is free of gaps is formed over the entire width of the scatter box belt system.

What is claimed is:

1. A filter press for reducing capillary-bound water content in fiber cells of a starting material comprising carbon-containing, finely comminuted solid materials and/or sludges, in particular raw brown coal, using the action of thermal energy and mechanical energy on the starting material to be dewatered, the thermal energy comprising superheated steam, and the mechanical energy being supplied to the starting material as surface pressure in pressure chambers, the filter press comprising:

- a rectangular pressure chamber releasably sealable in a gastight manner, the pressure chamber having an entrance and an exit, the pressure chamber including:
- a substantially stationary lower press plate having a press and filter surface, the lower press plate including structure for distributing heat; and
- a plurality of hydraulically mobile chamber walls including:
  - first and second blocking slide gates for releasably blocking the entrance and exit of the rectangular pressure chamber;
  - two bulkheads disposed vertically at outer longitudinal edges of the lower press plate, the bulkheads being pressed with variable hydraulic forces against longitudinal edges of the upper press plate;

an upper press plate, disposed between the exit and entrance and disposed between the two bulkheads, for applying pressure to the starting material;

hydraulic actuators for moving first and second blocking slide gates to block and open the entrance and exit; and pressing cylinders for controlling the movement of the upper press plate.

2. A filter press according to claim 1 including a cycle functional control system for controlling an amount of starting material provided to the filter press, and at least one sensor for determining whether the starting material provided to the filter press is above or below a desired amount, and wherein the control system controls the amount of starting material provided to the filter as a function of that determination.

3. The filter press according to claim 1 wherein the upper press plate has a press and filter surface.

4. The filter press according to claim 3 wherein the upper press plate also includes structure for distributing heat.

5. The filter press according to claim 4 wherein at least one of the lower and upper press plates includes horizontal bores for heating the at least one of the lower and upper press plates.

6. The filter press according to claim 3 wherein at least one of the lower and upper press plates includes vertical steam injection bores.

7. The filter press according to claim 6 wherein the vertical steam injection bores are uniformly disposed in the at least one of the lower and upper press plates.

8. The filter press according to claim 6 wherein the starting material is carried to and away from the pressure chamber on a metal fabric belt.

9. The filter press according to claim 6 wherein a filtrate passes through the vertical steam injection bores.

10. The filter press according to claim 1 including at least one hydraulic pressing device for moving one of the first and second blocking slide gates to apply pressure to the starting material.

11. The filter press according to claim 1 wherein the pressure chamber is operable such that thermal energy is applied during a first stage and the mechanical energy is applied during a second stage.

* * * * *